N. C. JENSEN.
ANIMAL SPRAYING APPARATUS.
APPLICATION FILED JULY 1, 1919.

1,315,309.

Patented Sept. 9, 1919.
2 SHEETS—SHEET 1.

INVENTOR.
Niels C. Jensen.
BY
ATTORNEY.

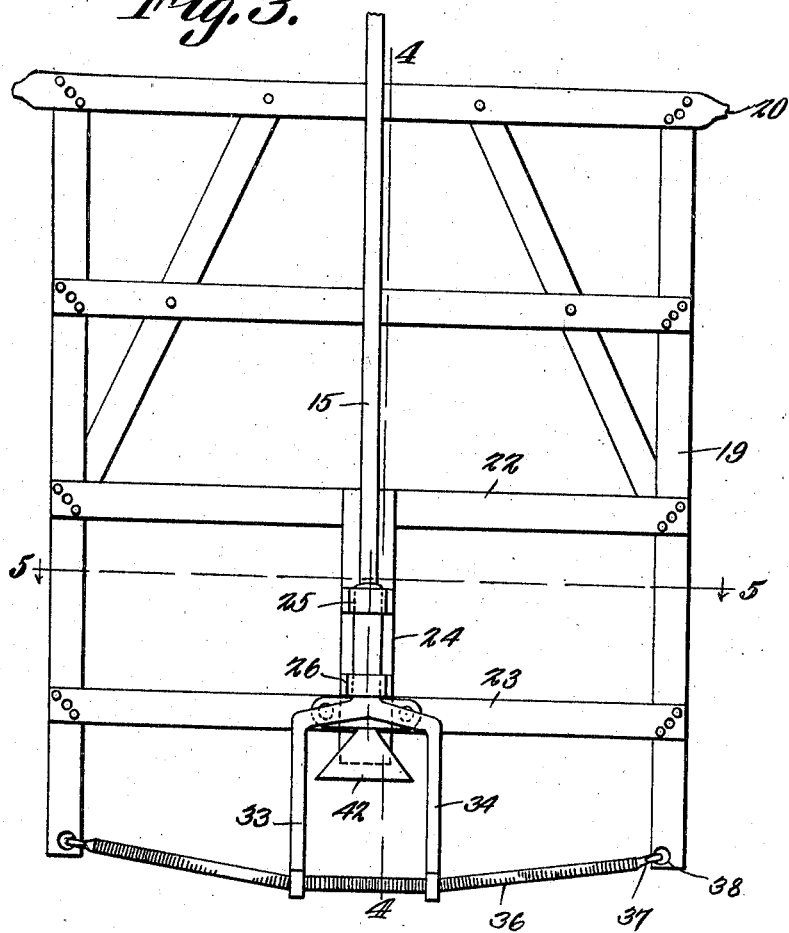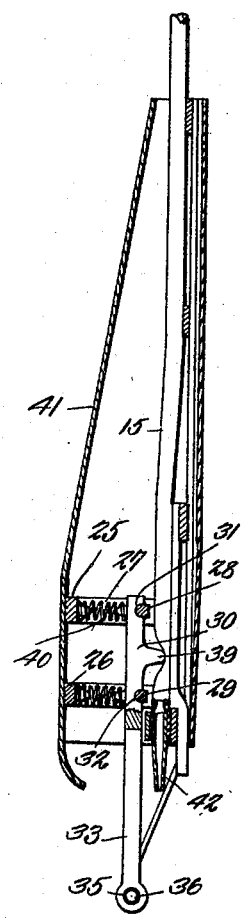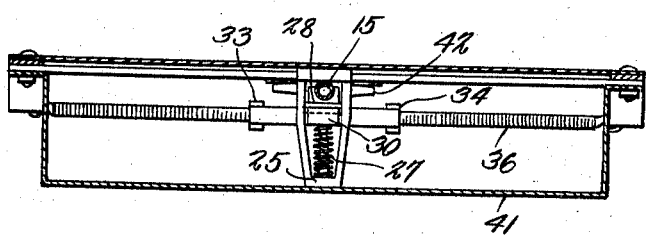

UNITED STATES PATENT OFFICE.

NIELS CHRISTIAN JENSEN, OF FORT DODGE, IOWA.

ANIMAL-SPRAYING APPARATUS.

1,315,309. Specification of Letters Patent. Patented Sept. 9, 1919.

Application filed July 1, 1919. Serial No. 307,942.

*To all whom it may concern:*

Be it known that I, NIELS CHRISTIAN JENSEN, a citizen of the United States of America, and resident of Fort Dodge, in the county of Webster and State of Iowa, have invented certain new and useful Improvements in Animal-Spraying Apparatus, of which the following is a specification.

This invention relates to animal industry and particularly to means for spraying animals and more particularly for use in spraying hogs.

An object of this invention is to provide novel means whereby the animal operates the mechanism automatically for the purpose of releasing the spray when the said animal is in such position as to receive it, so that by the use of a device of this character the animals are caused to operate the mechanism which releases the fluid, making it possible for the possessor of a device of this kind to distribute disinfecting fluid or medicated water over the animals in their passage or travel with respect to the said apparatus.

A further object of this invention is to provide novel means for opening and closing the liquid delivering device, the said device being normally set to close a discharge pipe.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification, wherein like characters denote corresponding parts in the several views, and in which—

Fig. 3 illustrates an enlarged detail view of the swinging gate;

Fig. 4 illustrates a sectional view on the line 4—4 of Fig. 3; and

Fig. 5 illustrates a sectional view on the line 5—5 of Fig. 3.

Figure 1:
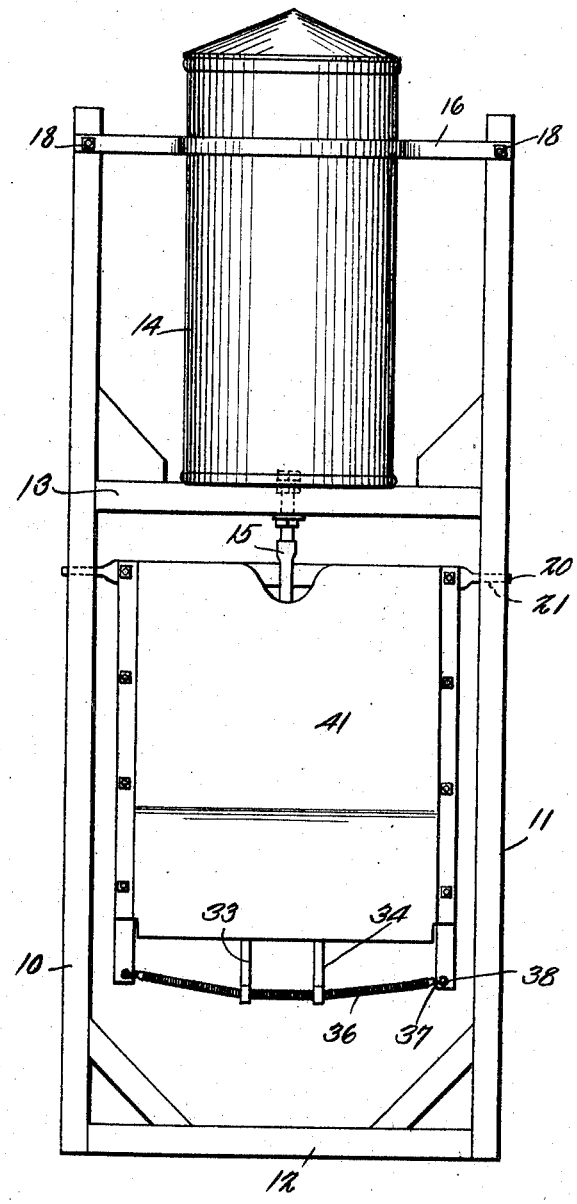
Figure 1 illustrates a front view of the device embodying my invention.

In these drawings I have shown a frame comprising the posts or uprights 10 and 11, and the sill or base 12 to which the uprights are connected and it is the purpose of the inventor that these frames shall be supported in any appropriate way, and as the means to support it is not a part of the present invention it is not shown in detail.

A beam 13 is supported by the posts between their ends and the said beam constitutes a support for the tank 14 which may contain a medicated liquid which is to be discharged through the flexible pipe 15 communicating with the bottom of the tank 14, as shown.

The tank is held on the beam by the straps 16 and 17 having their ends anchored to the posts by fastenings 18, such as bolts.

Figure 2:
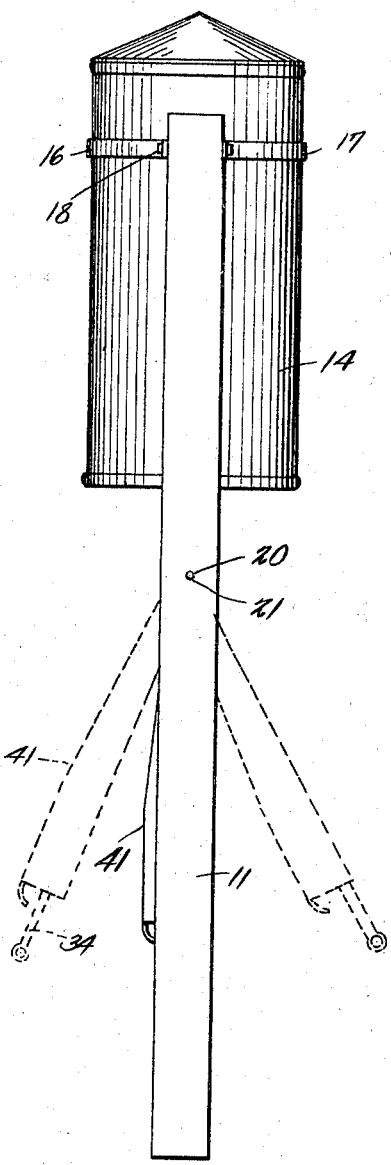
Fig. 2 illustrates a side elevation thereof.

A vertically swinging gate 19 has trunnions 20 which are mounted in apertures 21 of the post, and the said gate is free to swing as shown in the dotted line position, Fig. 2. The gate has cross ribs or bars 22 and 23 which in the present embodiment of the invention constitute anchorages for a plate 24 which plate may be secured to the anchorages in any appropriate way. Yokes 25 and 26 extend outwardly from the plate and the said yokes are separated one from the other and each yoke has a spring 27 bearing against it.

The yoke 25 has its sides connected by a rib 28 and the yoke 26 has its sides connected by a rib 29 and the said ribs preferably have rounded surfaces which constitute bearings for an arm 30 which arm has recesses 31 and 32 therein forming seats for the ribs. The arm terminates at its outer end in branches 33 and 34, each of which has an eye 35 in its end for the reception of a spring 36 which spring has its ends provided with hooks 37 adapted to enter eyes 38 in the sides of the gate. The spring as shown in Fig. 3, extends through the branches and has its ends anchored to the gate so that when the arm oscillates the spring will be tensioned and the arm will be returned to its normal position by the said spring.

Near the upper end of the arm or preferably at a point between the recesses the arm is provided with a lug 39 which, under normal conditions, bears against the flexible pipe 15 with sufficient pressure to cut off the flow of liquid through the said flexible pipe, the said lug coacting with the plate 24, which plate constitutes the backing against which the tube is pressed by the action of the arm. As augmenting the action of the spring 36, a spring 40 is interposed between the arm 30 and the end of each yoke, so that as the arm oscillates or is forced from its normal position by the action of an animal passing under the gate, the spring in one of the yokes will operate to restore the parts to normal position according to the direction of oscillation of the arm as will be apparent. That is to say, if the outer end of the arm is swung under the gate, the upper spring will be brought into operation for restoring the parts to normal position whereas if the lower end of the arm is swung in the opposite direction, the lower spring will operate to restore the parts.

A sheathing or apron 41 may be attached to the frame or gate to protect the operating parts of the mechanism and the lower end of the pipe 15 is supplied with a nozzle 42 which will deliver the fluid in a rather wide spray or stream so that it will be well distributed over the animal or animals that actuate the gate.

I claim:

1. In an animal spraying apparatus, a frame having a source of liquid supply and a flexible pipe leading therefrom, an oscillatory member mounted in the frame, a plate carried by the oscillatory member with relation to which the tube is suspended, a member for forcing the tube against the plate for cutting off the flow of liquid therethrough, and animal operating means for actuating the said member.

2. In an animal spraying apparatus, a frame having a source of liquid supply and a flexible pipe leading therefrom, an oscillatory member mounted in the frame, a plate carried by the oscillatory member with relation to which the tube is suspended, yokes carried by the plate, an arm pivoted on said yokes, a member carried by the arm for forcing the tube against the plate and controlling the passage of fluid therethrough, means for forcing the arm to normal position, and animal contacting means connected to the said arm.

3. In an animal spraying apparatus, a frame having a source of liquid supply and a flexible pipe leading therefrom, an oscillatory member mounted in the frame, a plate carried by the oscillatory member with relation to which the tube is suspended, yokes carried by the plate, an arm pivoted on said yokes, a member carried by the arm for forcing the tube against the plate and controlling the passage of fluid therethrough, means for forcing the arm to normal position, said arm having branches, a spring engaging the said branches, means for anchoring the said spring to the sides of the oscillating member, and means for returning the arm to normal position.

4. In an animal spraying device, a frame, a gate mounted therein to swing vertically, a plate carried by the gate, a fluid delivery tube suspended to be forced against the plate, yokes carried by the plate, a rib connecting the sides of each yoke, an arm engaging the said ribs and adapted to oscillate with respect thereto, means for holding the arm in engagement with the ribs, a member carried by the arm for forcing the tube against the plate and closing said tube, branches on the arm, a nozzle on the tube, and a spring engaging the branches of the arm and anchored to the said gate.

NIELS CHRISTIAN JENSEN.

Copies of this patent may be obtained for five cents each, by addressing the "Commissioner of Patents, Washington, D. C."